(No Model.)

J. C. BAYLES.
PIPE COUPLING WITH LEAD JOINT.

No. 422,177. Patented Feb. 25, 1890.

Attest:
L. Lee.
F. C. Fischer.

Inventor.
James C. Bayles, per
Crane & Miller, Attys.

UNITED STATES PATENT OFFICE.

JAMES C. BAYLES, OF EAST ORANGE, NEW JERSEY.

PIPE-COUPLING WITH LEAD JOINT.

SPECIFICATION forming part of Letters Patent No. 422,177, dated February 25, 1890.

Application filed October 9, 1889. Serial No. 326,398. (No model.)

*To all whom it may concern:*

Be it known that I, JAMES C. BAYLES, a citizen of the United States, residing at East Orange, Essex county, New Jersey, have invented certain new and useful Improvements in Pipe-Couplings with Lead Joints, fully described and represented in the following specification and the accompanying drawings, forming a part of the same.

The object of this invention is to furnish a means of wholly inclosing a flange formed integral with the pipe end in a strong but compressible packing, by which packing the flange may be effectively held and coupled to similar pipe ends or other fittings, as elbows, T's, or hub and spigot fixtures.

The invention furnishes a means of uniting any pipe-flanges, and where thin sheet-metal pipe is to be coupled it requires the bending of the pipe at its end into a projecting flange integral with the pipe.

The invention consists in the combination, with the pipe-flange, of a yielding packing applied as a gasket to the face of the flange and bent over the rim of the flange and down upon its inner or rear side, and suitable clamping devices to press upon the outside of such packing to clamp the flange within it.

It also consists in certain modifications hereinafter described and claimed.

Where the ends of two pipes are to be united, the lead gasket would be provided with circumferential rings upon opposite sides, and clamping-plates would be applied to the pipes behind the flanges and provided with annular recesses to inclose the lead gasket and clamp the pipe ends together; but where a single pipe end is clamped to an adjacent fitting the gasket would be provided with an annular ring at one side only and the opposed fitting may be constructed with a flat face to press the gasket against the pipe-flange and form a joint therewith.

The construction is fully shown in the annexed drawings, in which—

Figure 3:
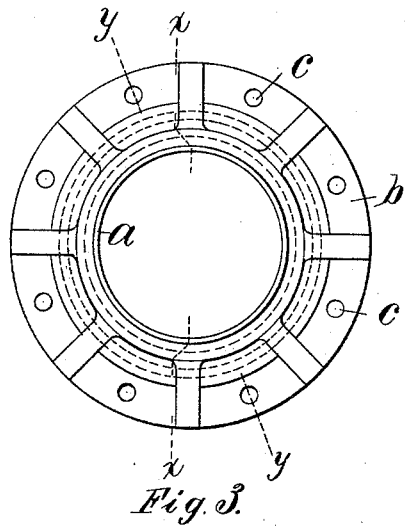
Figure 1:
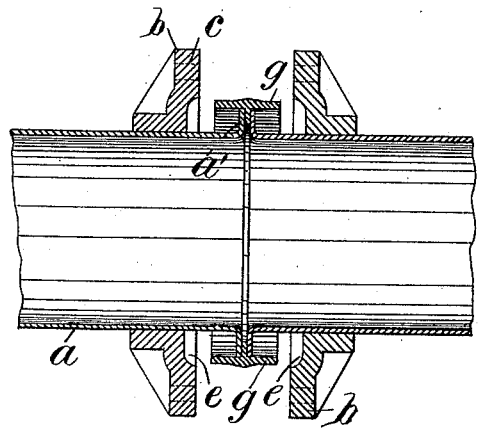
Figure 2:
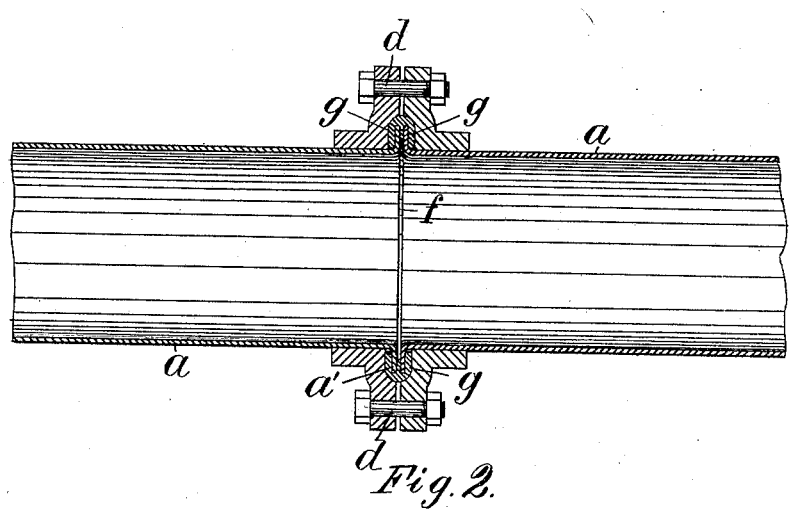

Figure 1 represents a section of two pipe ends with the gasket and coupling-plates in position thereon ready for the making of the joint. Fig. 2 represents the pipe ends coupled together by the gasket and plates. Fig. 3 is an end view of the pipe with one of the coupling-plates thereon.

$a$ are the pipe ends, and $a'$ the projecting flange formed at the end of the same.

$b$ are the coupling-plates, formed with bolt-holes $c$ to receive bolts $d$ parallel with the pipe.

$e$ is an annular recess, formed in the face of the coupling-plate to inclose the lead gasket $f$, which latter is shown in Fig. 1 with the circumferential rings $g$ projecting at its opposite sides above the edge of the flange $a'$, and in Fig. 2 bent down behind the flange $a'$ and clamped within the recess $e$.

As shown in Fig. 1, the coupling-plates would be applied to the pipe ends behind the flanges $a'$ before the joint was made, and in case the pipe were flanged at both ends the coupling-plates would be applied to the pipe before forming such flanges.

In making a joint between two pipes by my invention the gasket is inserted between the two flanges with the rings $q$ projecting over the same, and each of the rings is then bent downward by a mallet or other suitable tool into close contact with the inner side of the flange $a'$. The flanges are thus wholly inclosed in a lead packing, and pressure applied to the outer sides of the bent rings $g$ operates both to press the two pipe-flanges together upon the interposed gasket $f$ and to hold the bent rings $g$ into close contact with the exterior of the flanges $a'$. A triple joint is effected by the gasket thus arranged, the body of the gasket serving to form a joint between the faces of the flanges $a'$. The hammering of the rings $g$ downward behind the flanges operates also to form a joint at their peripheries, and the clamping of the bent rings upon the back of the flanges operates to form a third joint at such point, while the inclosure of the flanges within the entire mass of lead serves to impart great rigidity and durability to the union of the pipes.

The essential feature of my invention is the packing formed as an annular ring bent around the flange to form an annular recess therein fitted to the said flange, in combination with a coupling device operating in a direction parallel with the pipe to press such gasket against both surfaces of the flange.

I am aware that it is not new to apply a gasket to a pipe-joint, broadly; nor is it new to apply a gasket to the edges of flanges formed upon pipe ends and press the same against the edges of such flanges by means of clamps producing a radial pressure thereon, and I hereby disclaim the said constructions. My invention differs from the latter in comprising a ring provided with an annular recess fitted to the flange upon the pipe end and a clamping device operating parallel with the pipe to press the gasket upon the flat faces of the flange.

My invention is especially adapted to uniting pipes made of sheet metal, in which case it is desirable not only to pack the joint between the faces of the flanges, but to form a yielding surface upon the back of the flange in contact with the coupling-plates which press the flanges together. Such a yielding face upon the back of the flange enables the clamping-plates to find a more perfect bearing upon the flanges and to thus press them perfectly upon the interposed gasket, while the construction of my inner gasket integral with the outer ring or packing operates, as above described, to wholly inclosé the peripheries of the flanges and to prevent any leakage therefrom.

Having thus set forth my invention, what I claim herein is—

The combination, with two pipe ends provided with flanges, as described, of a lead gasket provided with rings upon its opposite sides bent over the peripheries of the said flanges upon their outer faces, and coupling-plates fitted over the pipe ends behind the flanges and connected by bolts parallel with the pipe to press the said rings upon the outer faces of the flanges, substantially as shown and described.

In testimony whereof I have hereunto set my hand in the presence of two subscribing witnesses.

JAMES C. BAYLES.

Witnesses:
L. LEE,
H. J. MILLER.